Jan. 30, 1951     W. J. DONOHUE     2,539,732
LIQUID AND SOLIDS PROCESSING APPARATUS
Filed Oct. 8, 1945     5 Sheets-Sheet 1
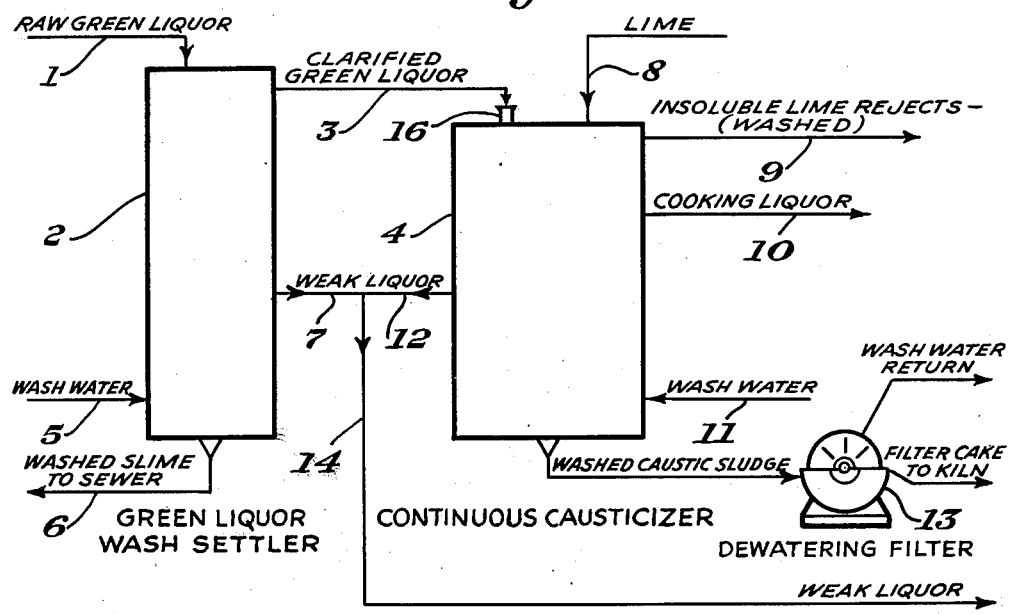
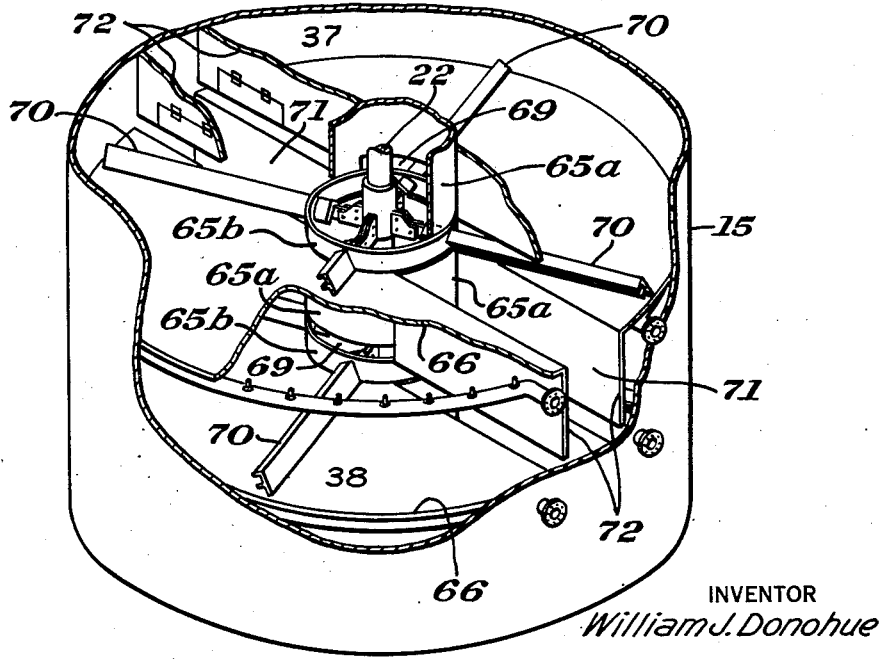
INVENTOR
William J. Donohue

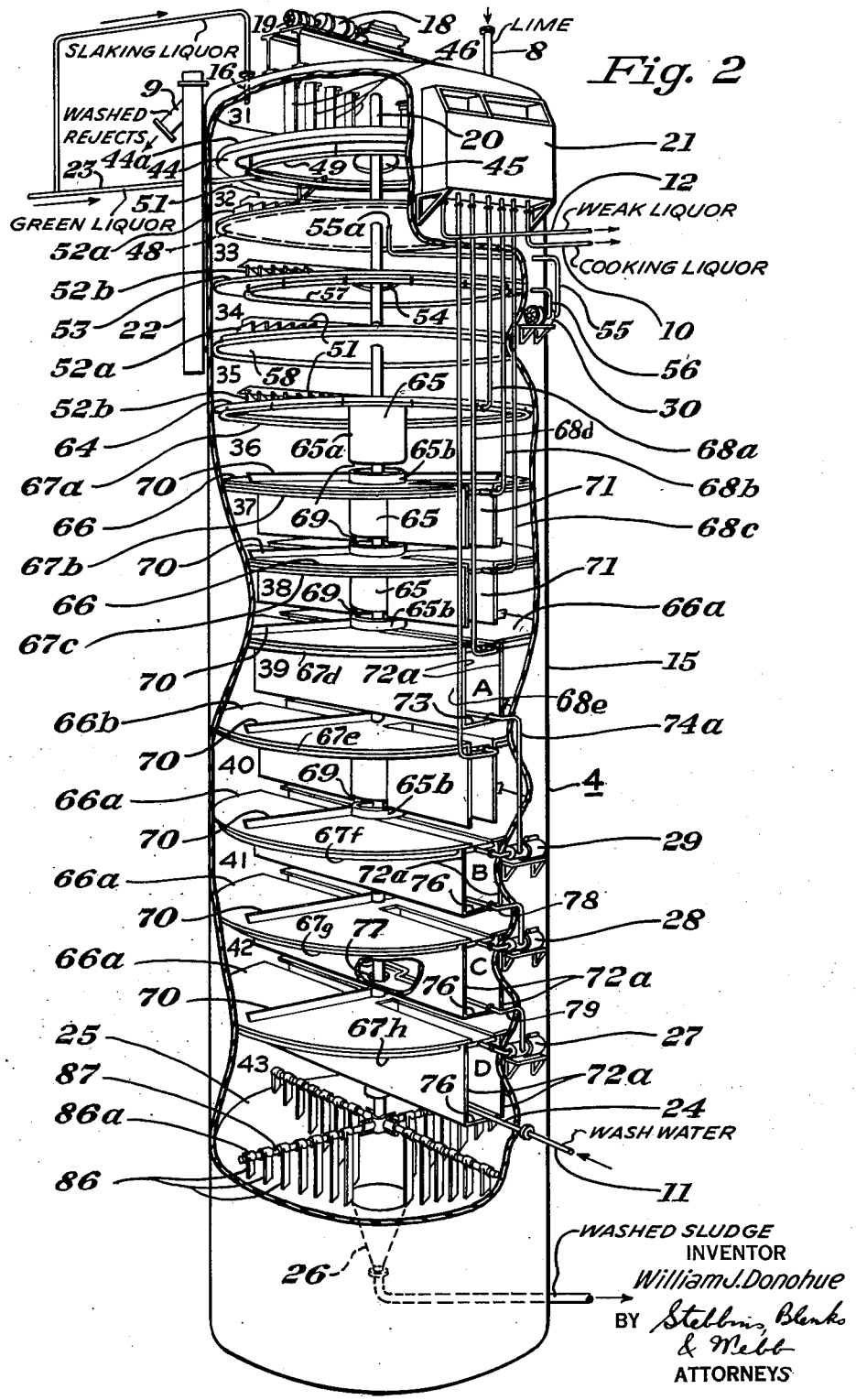

Jan. 30, 1951 W. J. DONOHUE 2,539,732
LIQUID AND SOLIDS PROCESSING APPARATUS
Filed Oct. 8, 1945 5 Sheets-Sheet 3

INVENTOR
*William J. Donohue*
BY
*Stebbins, Blenko & Webb*
ATTORNEYS

Jan. 30, 1951 W. J. DONOHUE 2,539,732
LIQUID AND SOLIDS PROCESSING APPARATUS
Filed Oct. 8, 1945 5 Sheets-Sheet 4
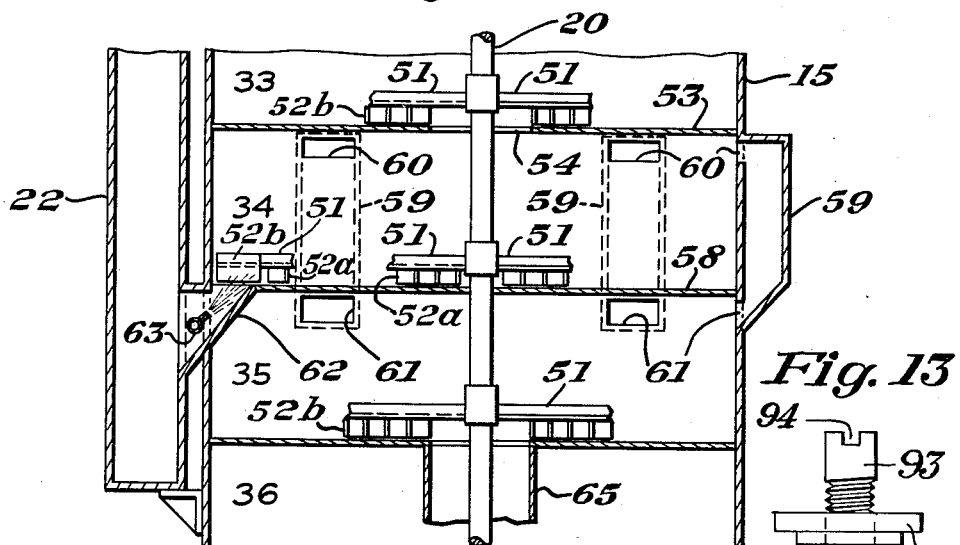
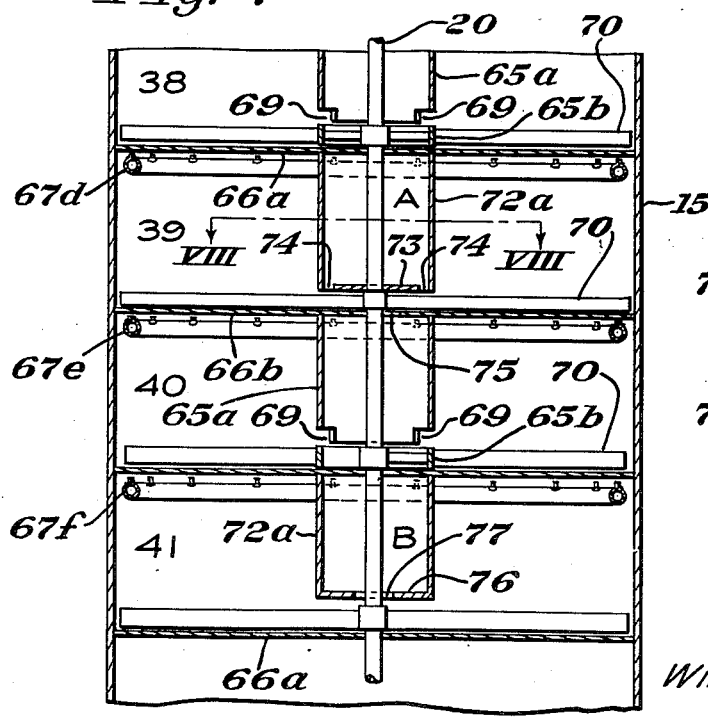
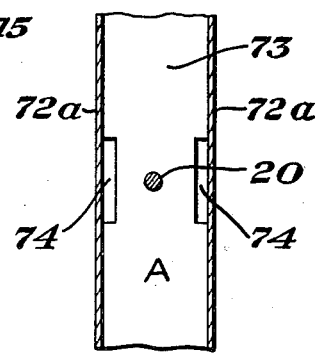
INVENTOR
William J. Donohue
BY
Stebbins, Blenko & Webb
ATTORNEYS Jan. 30, 1951 W. J. DONOHUE 2,539,732
LIQUID AND SOLIDS PROCESSING APPARATUS
Filed Oct. 8, 1945 5 Sheets-Sheet 5
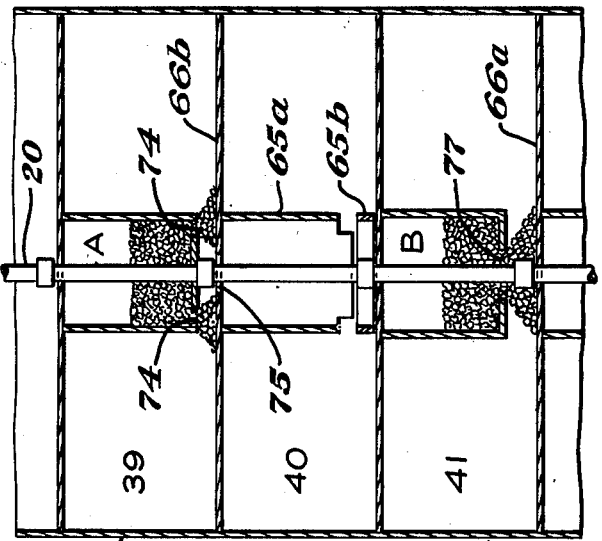
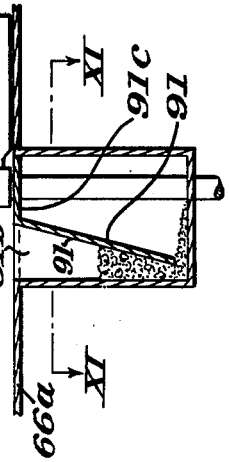
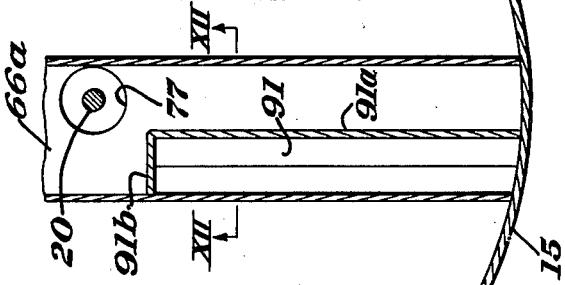
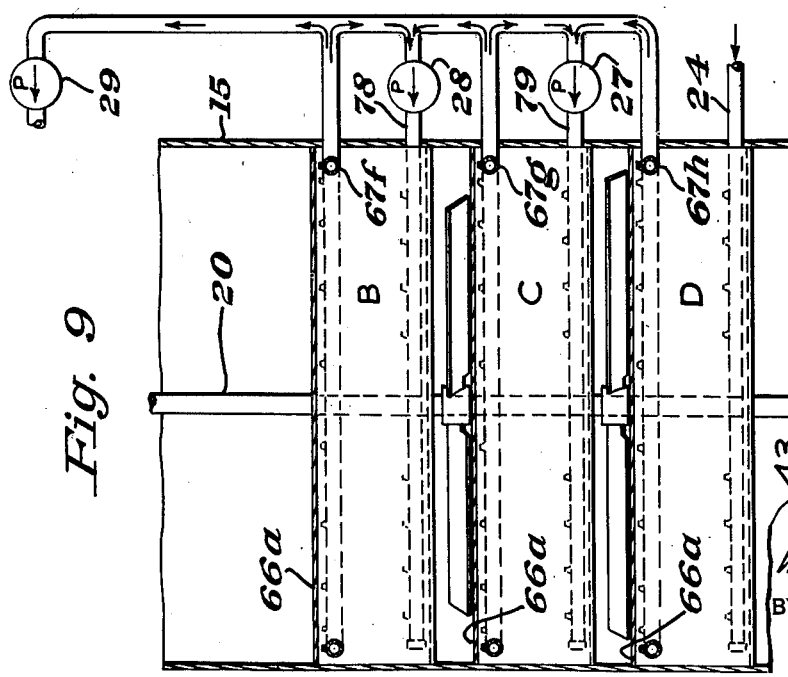
INVENTOR
William J. Donohue
BY Stebbins, Blenko
& Webb
ATTORNEYS Patented Jan. 30, 1951

2,539,732

UNITED STATES PATENT OFFICE 2,539,732

LIQUID AND SOLIDS PROCESSING APPARATUS

William J. Donohue, Aspinwall, Pa.

Application October 8, 1945, Serial No. 620,898

13 Claims. (Cl. 210—55)

This invention relates essentially to improved apparatus for the recovery of some constituent from a mixture of finely divided solids and liquids. It is applicable to cases where solids are contained in suspension in a liquid before introduction into the apparatus and also to cases where reactions take place within the apparatus between constituents introduced separately, resulting in a mixture containing suspended solids.

In operation, the materials from which the suspended solids are derived are introduced at or near the top of the apparatus, which is substantially full and has a single liquid level near the top thereof. The solids pass progressively downward and are removed at or near the bottom. The liquid constituent introduced at the top is removed at intermediate levels as the solids are separated therefrom by precipitation. Other liquid, introduced at or near the bottom of the apparatus, progresses upwardly and countercurrent to the settling solids and is removed at intermediate levels.

There are various processes in which the steps indicated in the foregoing are useful. The improvements herein claimed concern the apparatus and methods for accomplishing desired chemical or physical changes, but not the specific chemical or physical processes in which they are employed.

The invention is applicable whether the object be to treat the liquid with the solid, as in the case of water purification or to treat the solid with the liquid, as in the case of solvent extraction or washing. The nature of the treatment may be primarily physical or it may be primarily chemical, or a combination of physical and chemical treatments. The conservation of one constituent or more is usually the objective.

In case there is a change of state of one or more components from solid to liquid, or vice versa, the result is an increase or reduction of the saturation of the liquid with the component or components which are interchanged, and in such event the apparatus is especially designed to provide for the change in concentration in a progressive manner, that is, by passing it through a number of stages so that the concentration of the component in the liquid phase varies from stage to stage as the chemical or physical process may require.

The apparatus is especially adapted to conduct processes in which the flow of the materials is continuous, although the treatment may take place in successive stages, or simultaneously in different compartments. In this respect the processing is continuous, and differs from batch processing in which a given amount of liquids and solids is treated in one piece of apparatus and subsequently retreated in another piece of apparatus.

Frequently the volume of liquid used in any stage of the treating operation greatly exceeds the volume of material in suspension therein, although the reuse of the liquid may result in making it possible to treat a large volume of finely divided solid material with a comparatively small or moderate total amount of liquids. My invention provides for recirculating the liquid where desired.

As an essential feature the invention includes provision for a number of treating compartments, one above the other, the compartments being separated from one another by diaphragms or trays at moderate intervals so that the settling of solid material from the liquid between the trays does not require the particles to settle through the liquid for any great distance. This arrangement, of itself, is not new, settling apparatus with multiple trays being common with the art, as well as means for removing solid material from the individual trays after settling thereon. The invention provides unique compartments and passages in addition to the settling trays, some of which are especially adapted to effect a mixing of the solids with liquid and means for equalizing the liquid pressure on opposite sides of the opening from such compartments into lower adjacent settling compartments.

The apparatus consists of a tank of generally cylindrical section disposed with its axis vertical, substantially horizontal trays fixed with respect to the periphery of the tank, a scraper mechanism revolving so as to scrape settled material from the surface of each tray, passageways and ducts for the descending solids, including certain compartments for mixing solids with washing liquids, means for advancing liquids from settling to mixing compartments independently of any pressure differential between these compartments, means for withdrawing liquid effluent and means for removing the solids. My invention permits and provides the combining of a plurality of settling trays and other treating compartments above a plurality of washing or extracting trays in the same apparatus having only one liquid level. This is not possible using construction and methods heretofore known. The invention thus provides a simplified single apparatus for successive treatments which heretofore have required equipment having many separate units. My invention also permits and provides that one or more extraction or washing stages may, when desired, be split between two or more trays in a vertical series; i. e., both series and parallel flow can be obtained. This is highly advantageous in many circumstances and cannot be obtained with apparatus of prior construction.

The invention will be described in detail as applicable to preparing "cooking liquor" for pulp in the manufacture of paper by the soda process or by the sulphate process, although the apparatus may be used wherever similar operations are to be conducted. Cooking liquor, also known as "white" liquor, is prepared from "green" liquor by removing solid or collodial impurities from the green liquor and treating it with lime to convert the dissolved sodium carbonate to sodium hydroxide. Solid calcium carbonate is precipitated in this reaction and may be recovered and burned for re-use. If the mixing of all separated solids is not objectionable, as at sulfate plants where lime is cheap and recovery of clean calcium carbonate resulting from the reaction is not an object, or in plants employing the soda process in which the solids in the green liquor are not objectionable impurities if present in the calcium carbonate precipitate, this causticizing process may be effected in a single unit of apparatus. In other cases two units may be used effecting separate discharge of green liquor slime and washed calcium carbonate.

The herein described apparatus includes improved provisions for the reaction of lime and green liquor, which are more fully described and claimed in my co-pending application Ser. No. 663,971, filed April 22, 1946. These provisions are briefly described herein as examples of the various types of treating compartments which can be superimposed above my washing or extracting trays, due to the novel principle of this invention which does not impose the usual low limitations upon the liquid level that can be satisfactorily maintained in previously known apparatus of this type.

My invention will now be described in detail with reference to the accompanying drawings illustrating a preferred embodiment.

In the drawings:

Figure 1 is a flow diagram showing the causticizing process for cooking liquor employing the invention;

Figure 2 is an isometric view of the causticizer complete, with a portion of the shell removed to expose the interior parts;

Figure 5:
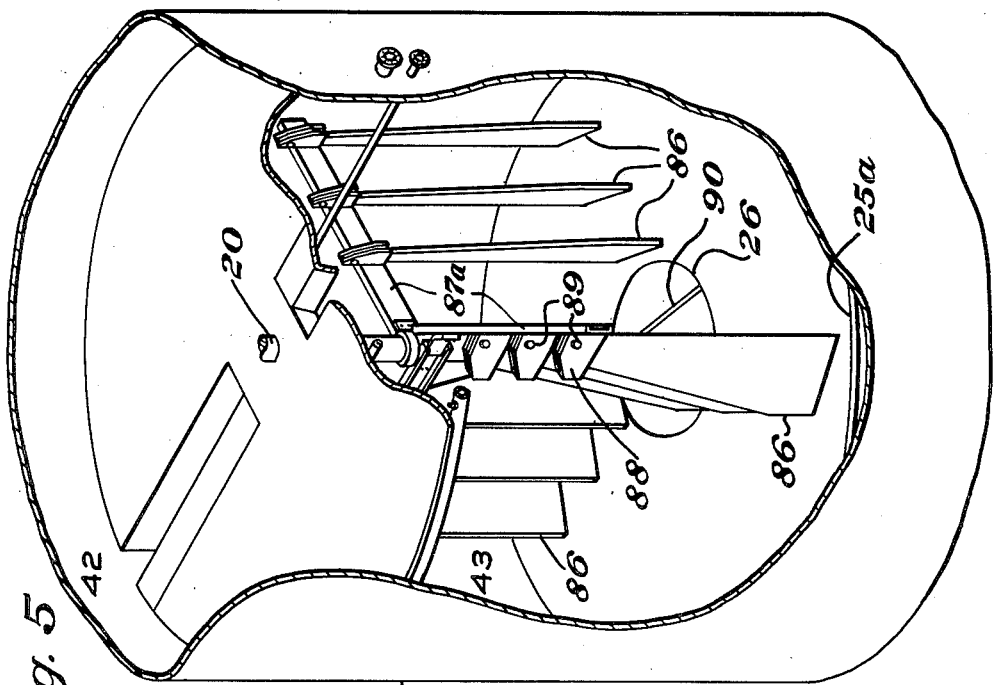
Figure 4:
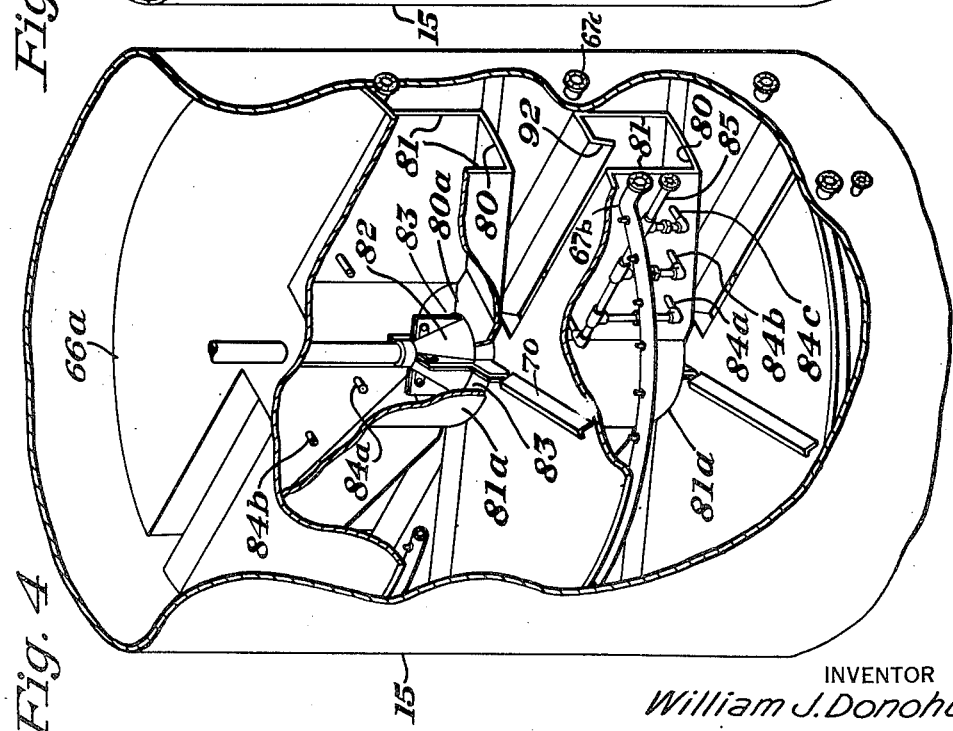

Figures 3, 4, 5, and 6 are similar views of different sections of the causticizer showing the construction in more detail, Figure 3 being a typical settling section, Figure 4 being a typical extractor section, and Figure 5 being the thickening section, with a modification differing from Figure 2;

Figure 6 is a vertical section through a portion of the apparatus, certain parts being omitted;

Figure 7 is a vertical section through another portion of the apparatus;

Figure 8 is a horizontal section taken through the plane VIII—VIII of Figure 7;

Figure 9 is a partial vertical section showing a modification in the extracting liquid circulation;

Figure 10 is a section similar to Figure 7 showing a sludge sealing arrangement;

Figures 11 and 12 are supplementary fragmentary sections showing an alternate sealing arrangement, Figure 11 being a horizontal section along the plane XI—XI of Figure 12, and Figure 12 being a vertical section at the plane XII—XII of Figure 11; and Figure 13 is a fragmentary elevation view of a riser pipe which extends into an effluent box.

Referring first to Figure 1, raw green liquor is delivered continuously through pipe 1 to the top of a green-liquor wash settler 2, in which is produced a clarified green liquor effluent delivered through pipe 3 to the causticizer unit 4. Solids separated in the wash settler 2 are washed by water entering near the bottom through pipe 5, the solids being discharged to the sewer through conduit 6. The wash water enriched by compounds dissolved from the solids is removed through pipe 7 as weak liquor. In the causticizer 4, quick lime is introduced through conduit 8 concurrently with the green liquor entering through pipe 3. The lime is slaked and then gently mixed with the green liquor in a series of reaction trays hereafter described and shown in other figures, in a manner to treat all the liquor effectively and to form coarse crystals of calcium carbonate which are readily separated and washed. Insoluble lime particles, sand, grit, etc. are removed from the apparatus at 9, and the reaction products progress into settling and extracting trays below. Clarified cooking liquor is discharged from the apparatus through pipe 10, and the calcium carbonate precipitate, after being washed, is discharged through the bottom of the apparatus whence it is delivered to a dewatering filter 13, and thence to a kiln (not shown). Water for washing the calcium carbonate enters the causticizer near the bottom through pipe 11, and after extracting soluble compounds emerges as weak liquor through pipe 12. The weak liquor effluent from pipes 7 and 12 may be combined and delivered by pipe 14 to the dissolvers (not shown) and reused in making up of raw green liquor.

The wash settler 2 may be omitted in some cases. When no wash settler is used, raw green liquor is delivered directly to the causticizer through pipe 3. All of the essential features of the wash settler are present in the causticizer. The principal difference between these units is the omission in the green-liquor wash settler of the slaking and reaction trays. Figure 2, which shows a complete causticizer unit 4, also shows the essential construction of the wash settler 2, and both units 2 and 4 can be described with reference to the same drawing.

Referring now particularly to Figure 2, my invention provides a cylindrical tank 15 having at the top a slaking liquor inlet 16, a lime inlet 8, and driving gear 18 provided with a suitable motor 19 whereby a vertical shaft 20, extending longitudinally and co-axially through the tank 15, may be rotated at a suitable speed. Near the top of the tank, on the outside thereof, are mounted the effluent-collecting box 21 and solids-rejects elevator 22. A liquid delivery pipe 23 for the green liquor to be treated also enters the tank near the top. The wash water delivery pipe 11 enters near the bottom of the tank. The tank bottom 25 is conical as shown in Figure 2, and is provided with a central outlet 26 for thick-end washed solids. A horizontal flat bottom 25a as shown in Figure 5 may also be used and in certain cases is preferred. Figure 2 shows several motor driven pumps, 27, 28, 29, and 30, on the outside of tank 15. They are provided for the extraction and reaction portions of the apparatus.

Internally, the tank 15 is separated by substantially horizontal partitions or trays into compartments or treating zones, thirteen being shown, the particular number being variable to suit different conditions, these zones being numbered 31 to 43 inclusive. In zone 31, the quick lime is slaked with green liquor. Reaction between the lime and the green liquor starts immediately and continues in zones 32, 33, 34, and 35. In zones 36, 37, and 38 the causticized cooking liquor is clarified by settling out the calcium carbonate crystals and the clarified liquor is removed. In zones 39 and 40 the calcium carbonate is given the first wash, these two trays operating in parallel, and the weak liquor is there removed. Washing is repeated successively in zones 41 and 42, and the solids are finally thickened in zone 43 from which they are removed. The partitions separating the above described zones vary somewhat in construction, depending upon their function.

The compartments or zones 31, 32, 33, 34, and 35 are more fully described in my co-pending application Ser. No. 663,971, filed April 22, 1946, previously referred to, and are described here only sufficiently to explain their functions. The uppermost partition 44 is supported upon shaft 20 in a manner similar to that shown in my copending application above identified and rotates therewith. It has an upstanding flange 44a at its circumference and a circular opening 45 at the center. Lime (CaO) enters the apparatus through inlet 8, near the circumference of the revolving tray 44, upon which the lime falls. Stationary inclined blades 46 depend from the top of tank 15 and plow the revolving bed of lime towards the center opening 45. The lime on the tray is slaked either by spraying green liquor thereon as by distributing pipes fed by conduit 16, or by maintaining the liquid level in tank 15 above tray 44 so as to submerge it.

The horizontal partition 44 is the only one in the apparatus which is rotated; all of the remaining partitions are fixed in position and are supported from the wall of tank 15. Shaft 20 extends through all these partitions, and is fitted with radially extending scraper arms closely set to scrape all partition floors. Delayed action, plow-type scrapers which plow the solids forward intermittently as distinguished from the continuous removal type of scraper which moves solids across a tray in a single pass are provided in compartments 32, 33, 34, 35, and 43 in order to effect delayed action movement of the solids; in all other compartments straight scraper arms are provided to effect primarily a removal of settled solids as rapidly as possible. Details of these parts will be subsequently described as the several kinds of compartments are discussed.

In reaction compartments 32 through 35 the hydrated lime and green liquor are gently agitated and detained, being kept in intimate contact so as to effect desired causticizing of the green liquor and to form a calcium-carbonate sludge consisting of unbroken, coarse and readily settling crystals. The liquid level is maintained above or somewhat below the revolving tray 44, all the lower compartments being full. Green liquor from pipe 23 is introduced into compartment 32 through distributing pipe 49. Lime enters at the center through hole 45, and progresses with the liquor towards the circumference of partition 48, which is spaced from the wall of tank 15 to permit passage of the materials into compartment 33. The partition is supported from the wall of tank 15 by any convenient means such as circumferentially spaced brackets. Radial arms 51 having plows 52a thereon are rotated by shaft 20 to move settled material radially outwards toward the edge of the partition for passage to the next lower compartment. In compartment 33, the solids outlet is a central opening 54 in the tray 53, and the generally horizontal flow of the materials is radially inwards, the plow blades 52b having a pitch opposite to that of the blades 52a in the compartment above. There is, however, a separate liquids outlet from the compartment 33 by the pipe 55 having a fluid inlet 55a near the center of the tank 15 and slightly below the partition 48. Liquid withdrawn from compartment 33 through 55 is delivered by pump 30 to compartment 34 through pipe 56 and circular manifold 57 having outlet holes spaced therealong. Liquid may thus be circulated through compartments 33 and 34 at any desired rate by means of pump 30, thus agitating the contents of compartment 34 to the desired extent.

Partition 58 forms the bottom of compartment 34, but this partition has no opening communicating with the next compartment 35. Liquids and solids in suspension in compartment 34 flow out gradually into compartment 35 below through external ducts 59 (see Figure 6) spaced at intervals around the circumference of tank 15, the ducts 59 having inlet openings 60 spaced a suitable distance above the partition 58 and outlet openings 61 below 58. Undesired insoluble solid pieces settling to the bottom of compartment 34 are scraped radially outwards by pitched blades 52a mounted on arms 51 and circumferentially by radial blades 52b mounted on the tips of arms 51, into a chute 62 leading to rejects elevator 22. This elevator may, for example, be of the bucket type which is well known. The casing only thereof is shown. This casing is liquid tight and the conveying buckets moving therein remove solids from below the level of liquid in tank 15, and discharge them above the liquid level. Jets 63 are provided in chute 62, supplied with fluid under pressure from pump 30 (by piping not shown), and directed against the downcoming solid rejects, to wash them of fine solids and return such fine solids in suspension into compartment 34. The jets 63 also provide an upward liquid velocity in chute 62 sufficient to prevent fine solids from flowing downwardly therethrough.

Compartment 35 is the last in the series of reaction trays, and serves chiefly as a holding and stilling compartment and to provide means of radial flow to a single central outlet. Its bottom is partition 64 which opens at the center into the feed duct 65 for the multiple settling tray group below. Solids settling out in compartment 35 are scraped radially inwards by means of blades 52b mounted on rotating arms 51 as previously described, and liquids and solids in suspension flow out together into duct 65.

It will be noted that in the above described reaction apparatus the mixing compartment 34 is disposed between the settling compartments 33 and 35. Solids enter compartment 34 through the opening 54, above and below which the liquid pressure is substantially equalized; and liquids are pumped into compartment 34 separately. This is generally similar to the arrangement of settling and mixing compartments in the washing section subsequently to be described; however, in the reaction section the liquid and solids move in the same direction, whereas in the washing section, they move in opposite directions.

The settling portion of the apparatus includes a plurality of settling compartments 36, 37 and 38 as shown in Figure 2, separated by horizontal partitions or trays 66. These several settling trays are operated in parallel. A feed duct 65 is provided in the form of a vertical passage through the center of the apparatus having outlet openings near the trays 66 or 66a through which the turbid caustic liquor may flow radially towards the circumference of the tank. This radial flow is at low velocity and the suspended solids settle out of the liquid and accumulate on the trays. The effluent outlets from each of the several compartments are rings of piping 67a, 67b and 67c, extending circumferentially around the tank below the partitions or trays 66 or 66a, which form the ceiling of the compartment below and the floor of the compartment above. These outlet pipes have holes in them at suitably spaced intervals to permit liquid collection from the top of the compartment by the outlet pipes. Settled solids are scraped by rotating arms 70 into vertical sludge compartments 71 extending downwardly from the settling compartments. In Fig. 2, portions of effluent piping 67a, 67b and 67c appear in passage 71; but these portions have no perforations for withdrawing liquid from 71, and the piping may be brought outside tank 15 on each side of 71 as shown in Fig. 3 if desired.

Riser pipes 68a, 68b and 68c, the upper ends of which terminate in effluent box 21 at levels somewhat below the liquid level in tank 15, are connected to outlet manifold rings 67a, 67b and 67c respectively, and cause the removal by overflow of clarified cooking liquor from the apparatus. By providing means for separately adjusting the elevation of the outlet ends of pipes 68a, 68b, and 68c, as is well known in the art, the rate of overflow from the three settling compartments may be proportioned as desired. Figure 13 illustrates a means whereby the elevation of the outlet ends of the pipes 68a, 68b and 68c may be adjusted. In this figure the pipe 68a is shown. The construction for the pipe 68b and 68c is similar. A pipe 68a extends a short distance through the bottom of the effluent box 21 and carries at its end a flange 92. The flange 92 is interiorly threaded. A pipe 93 is exteriorly threaded to screw into the flange 92. Rotation of the pipe 93 will therefore raise or lower the pipe 93. Opposed slots 94 (only one of which is shown in Figure 13) can be cut in the upper end of the pipe 93 so that the pipe can be gripped by a wrench. The cooking liquor delivery pipe 10 has its inlet substantially flush with the bottom of effluent box 21, and is of such capacity that the outlet ends of pipes 68a, 68b, and 68c are not submerged, but discharge by overflow.

Feed ducts 65, which conduct the suspension of solids in fluids to the settling trays, is a vertical cylindrical passage extending through central openings in partitions 66 and ending at the uppermost partition 66a, which differs from 66 only in that there is no opening at the center of 66a. This will be apparent by comparing Figures 3 and 4 where these two partitions are most clearly shown.

Duct 65 has an open top into which the reaction products flow from compartment 35, a bottom formed by the central portion of partition 66a, and outlet slots 69 (see Figure 3) in the cylindrical wall arranged in pairs diametrically opposite one another just above the rotating radial arms 70. The closed cylinder wall between the slots prevent direct flow of the suspension into the sludge passages 71 subsequently to be described and cause substantially all of the suspension to flow radially towards the circumference of the settling trays. The cylindrical portion of feed duct 65 is comprised of stationary tubes 65a depending from the partitions above, and rotating rings 65b supported by the arms 70. Slots 69 are cut in the bottom of tubes 65a, and the rings 65b fit closely between successive tubes 65a in compartments 36 and 37, and between tube 65a and the upper surface of partition 66a in compartment 38.

Solids separated in the settling compartments are scraped from the floor thereof into the sludge compartments 71 formed by vertical walls 72 and 72a depending from aligned substantially radial slots in the partitions 66 and 66a which extend from the wall of the feed duct 65 to the wall of tank 15. The lower ends of walls 72 terminate sufficiently above the horizontal partitions below to permit the scraper arms 70 to pass through as these arms are rotated. The lowermost sludge compartment 71 has a bottom plate 73 extending between the two lateral walls 72a. Solids scraped from the surfaces of the partitions and into compartment 71 settle and accumulate on the bottom 73, where, as will be subsequently explained in greater detail, they are given the first mix with wash water.

The settling section described in the foregoing provides radial flow of the clear liquid and removal of the solids in a tangential direction, i. e., substantially at right angles to the flow of liquid; this method of separation is highly advantageous as pointed out in my Patent 1,968,031. The present invention provides certain novel improvements whereby that method may be conducted in a circular tank with a greater conservation of components of the feed than was heretofore possible, and whereby such multi-tray parallel flow settling can be followed, in the same apparatus, by a counter-current washing or extracting treatment of the settled solids.

Following the primary separation of the solid reaction products in the settling section, these flow by gravity through a series of compartments 39 to 43 where they undergo washing or extraction treatment in a novel and particularly efficacious manner. My invention provides mixing compartments of ample size in which the solids are caught, detained, and contacted by forced liquid circulation with wash water or other suitable extracting liquid, combined with tray settling whereby the mixed suspension is separated as the solids progress from stage to stage through the apparatus. The mixing compartments may be of various forms and size, and the piping and pumps for circulating the extracting liquid may be arranged in many combinations, such as, for example, to recycle the extracting liquid if desired, and to separate a mixed suspension in one settling tray only or in several settling trays in parallel where desired. The examples herein described are illustrative only, showing apparatus suitable particularly for the washing of caustic sludge solids, but many modifications and variations are within the contemplation of this invention.

The bottom trough of sludge compartment 71, i. e., the trough formed by partitions 72a and bottom 73, wherein the settled sludge accumulates, forms a mixing compartment which is designated A in Figure 2, wherein wash water is introduced and dispersed through the solids by means of a perforated pipe 74a and pump 29. There are four mixing compartments shown in Figure 2, the other three being indicated by the letters B, C, and D, which are similar to A but not identical therewith. The suspension of solids and liquids produced in A flows out into the two settling compartments 39 and 40, as shown in Figure 7, emerging from A through two slots 74 (see Fig. 8) on opposite sides of the central portion of 73, whence one portion flows out radially into compartment 39 and the remainder flows on through circular opening 75 provided in the center of partition 66b, entering a feed tube 65a having notches 69 which deliver the suspension to compartment 40. It will be noted that the construction admitting the suspension to compartment 40 includes a rotating ring portion 65b, closing the direct path from 65 to the solids-collecting and mixing trough B, in the same manner previously described in connection with the settling section. The two settling trays 39 and 40 thus effect a separation of the wash or extracting liquor from the solids, the liquor flowing radially to manifolds 67d and 67e, from which it is delivered to overflow box 21 through riser pipes 68d and 68e, where it is recovered as weak liquor through pipe 12 in the same manner as the cooking liquor is removed by overflow as previously described. The portions of effluent piping 67d and 67e shown in Fig. 2 between partitions 72a and 72 are not perforated for removal of liquid, and if desired the pipes 67d and 67e may be brought outside tank 15 on each side of the partitions similar to the arrangement of pipes 67b and 67c in Fig. 4.

Suspended solids scraped from the upper surface of partition 66b in compartment 39 fall between partition plates 72 into the second mixing compartment B, the solids scraped from 66a in compartment 40 falling directly into B. Bottom plate 76 is the same in mixing compartments B, C, and D; it frames into the two vertical transverse partitions 72a at each side which extend clear across tank 15 and frame into the wall thereof at each end and has a circular opening 77 at the center for the egress of solids in suspension in extracting fluid into the companion settling trays. In compartment C, Figure 2, a portion of wall 72a has been cut away to reveal the outlet 77. Extracting fluid for washing the solids is delivered to compartments B, C, and D through perforated pipes 78, 79, and 24. The suspensions thus created flow out radially in the settling compartments, the fluids being withdrawn through perforated collecting rings 67f, 67g, and 67h, and the solids progressing downward by gravity, scraping, and fluid agitation towards the bottom of tank 15, where they are thickened and removed.

It will be noted that as the solids progress downwards through the extracting section of the apparatus, wash water (or other suitable extraction liquid) progresses upwardly countercurrent to the solids. Wash water is introduced near the bottom of the apparatus, through pipes 11 and 24 and is mixed with the sludge which has been scraped off of partition 66a in compartment 42, the water and the sludge being mixed in compartment D flowing out together at opening 77 into bottom compartment 43. A circumferential pipe 67h provided just below partition 66a draws the fluid radially and upwardly, by the action of pump 27, delivering the separated liquids to the mixing trough C which receives the sludge from the compartment 41 above, where the liquor is mixed with the sludge again and dissolves therefrom more of the desired soluble materials, the mixture being discharged through a central opening 77 into the settling compartment 42. Here the solids and the effluent are separated, the effluent being pumped by pump 28 from the circumferential pipe 67g into the mixing compartment B, from which it flows, carrying suspended solids, into settling compartment 41. The liquid is withdrawn from this compartment through pipe 67f and pump 29. The next two successive settling trays are operated in parallel, as previously described. It will be observed that pump 29 does not deliver to a mixing trough immediately above, but to trough A depending from the second tray above, and that there are two settling trays in parallel below, the effluent from which is removed as weak liquor. The water thus flows upwardly through the tank becoming richer in soluble materials and the solids descend to the bottom of the tank being given successive washing and settling treatments.

The mixing compartments may be of any size and form desired. Where long contacting and mixing are desired, these compartments may be of substantial volume providing long detention therein of the solid particles. The trough-shaped compartments herein described afford more effective extracting in apparatus of the same diameter and size than can be accomplished by any wash-settler type known prior to my invention.

Figure 4 shows an alternate construction of the mixing troughs in the extracting section of the apparatus. In this figure the mixing troughs have sloping bottoms 80 instead of the horizontal bottoms 73 or 76 previously described, providing a transverse trough somewhat deeper at the center of vessel 15 than at the circumference. The side walls 81 of the trough are vertical planes on each side of the center section, but are bulged to cylindrical contour at the center, as indicated at 81a. Fixed to shaft 20 at the place of attachment of the radial scrapers 70 are inverted cone shaped members 82, towards which extend to within suitable running clearance, horizontal segmental extensions 80a of bottom 80, thus forming a cover or shield over the inner end of the sludge collecting slot in the tray below. There are thus formed two diametrically opposite arcuate outlet slots 83 for entry of mixed suspension into the settling compartment from the mixing trough, defined at the inner radius by cone 82, at the outer radius by the bottom edge of 81a, and at the ends by edges of stationary bottom segments 80a.

Instead of perforated spray pipes as shown in Figure 2 for admitting washing or extracting liquid, nozzles 84a, 84b, and 84c entering side walls 81, are shown in Figure 4 so as to direct jets of liquid horizontally in a manner effectively to stir up and agitate the solids. Liquid is supplied through manifold piping 85, which after connecting to the nozzles 84a, 84b, and 84c on one side of the mixing trough, crosses over near the center of the tank and is connected to three like nozzles 84a, 84b, and 84c on the opposite side of the apparatus.

In the foregoing description of the washing section, the flow rate through inlet pipe 24 and pumps 27, 28 and 29 would be substantially the same, admitting liquid to the mixing compartments and removing it at the same rate from the settling compartments, and advancing the liquid at this rate through the successive series of treating zones, without recirculating the liquid at any of the zones. In some extracting and leaching processes recirculation of liquid is desirable if not necessary, as the extraction may be considerably increased by repeated contact of liquid and solids in one or more of the mixing compartments. This is very easy to provide using the pumps for circulating liquid according to my invention, and may be accomplished using a variation in piping shown in Figure 9. Using this arrangement, pumps 27 and 28 would be provided with a capacity of, for example, twice the inlet flow through pipe 24, and pump 29 would have the same capacity as the flow in 24. The suction side of pump 27, however, is connected both to draw-off pipes 67h and 67g, so as to take from each substantially half its capacity; i. e., removing through 67h incoming wash water at the rate it is introduced through 24, and a like quantity of fluid recycled from pipe 67g. Pump 28 similarly draws simultaneously equal amounts of liquid from 67g and 67f, that drawn from 67f being recycled to mixing compartment B. Pump 29, on the other hand, removes through 67f only the net overall liquid flow, which is the same as introduced through inlet pipe 24. Flow through the various branches of the piping may be proportioned and regulated to practically any recycling rates which may be desired, using valves of suitable type where desired according to well known hydraulic practice. Figure 9 is diagrammatic only, and valves are omitted for the sake of simplicity.

A characteristic and novel feature of the above-described counter-current extracting apparatus is the construction whereby no sludge seal is required between the successive compartments during operation. In this invention the flow of liquid is correctly directed from the effluent outlet of a lower tray to the mixing compartment discharging on the tray above, by means of a pump, and does not depend upon balancing the hydraulic pressures in the successive compartments on opposite sides of a sludge maintained seal between them. Such seals in the past have been subject to breakdown. Another exclusive advantage resulting from the improvement is that certain washes may be split between two trays where large settling area is desired, thus permitting the use of machines of smaller diameter than heretofore were required.

The present invention, also provides for the first time a settling type extractor wherein the liquids may be recycled at any desired rate and at any mixing or extracting compartment.

Compartment 43 in Figure 2 may be called the sludge-thickening section of the apparatus. It is a settling section of substantially greater depth than the other compartments, and the layer of precipitated solids on bottom 25 is deeper than the deposits permitted to accumulate upon the bottoms of the trays of the settling and extracting sections. The bottom 25 may be conical as shown in Figure 2, or flat as shown in Figure 5. The thickened sludge is scraped towards and into the solids discharge outlet 26 by means of plows 86, depending from arms 87 which extend radially from shaft 20. Preferably (and especially where the sludge is heavy as in the case of calcium carbonate precipitate in the causticizer), the plows are pivotally supported from the rotating arms, hanging as pendulums which can deflect as they are dragged through the material on the bottom of the apparatus. In Figure 2, the arms 87 are cylindrical and blades 86 have hubs 86a swiveled thereon. In Figure 5, the arms 87a are structural shapes such as channels, along which are spaced paired bracket plates 88, drilled for hinge pins 89. The plows 86 are drilled at the upper end to receive pins 89, whereby each plow may be pivotally hung between two bracket plates 88 of a pair. The axis of the pivot is thus perpendicular to the working face of the blade providing easier removal of the blade from the material.

In Figure 5, the shaft 20 is extended downwardly below the arms 87a, and has attached to its lower end a paddle 90, which extends any desired distance into outlet 26. Paddle 90 thus revolves with shaft 20 and agitates the outflowing thickened sludge, thereby facilitating removal of the solid material.

In the foregoing description, it has been pointed out that under operating conditions the flow of solids from compartment to compartment is rendered as free as possible and that congestion of passageways, provided for sealing purposes in the apparatus previously known, is avoided by my invention. This is an improvement of great importance. Experience with sludge-sealed compartment settlers and washers has proved not only that the seals are a source of trouble and of poor clarification because of breakdown on the seal, but also because the seals become more unstable as the head of fluid above them is increased. Furthermore, there is an inherent conflict in attempting to effect thorough mixing and to maintain a dense sludge sealing mass in the same compartment, which apparatus of prior construction requires. Obviously, not only is the sealing imperfect but thorough mixing of the solids is sacrificed in order to effect the sealing; and it is a fact that good and efficient mixing is not obtained using apparatus of that type. Hence it has heretofore been impossible to superimpose a multi-tray settler section above a multi-tray extracting section in apparatus of this type. This superposition effects great economy in operation, as it permits continuous gravity flow of the solids through a single apparatus in a natural and logical manner, and eliminates objectionable rehandling steps. Also important is the saving of floor space and in the room necessary to install the equipment generally.

My invention does, however, provide solid or sludge seals at certain places in the apparatus which are effected automatically during shutdown only. It will be apparent that the concentration and density of the liquor differs in the various sections and compartments of the apparatus when it is being operated. The seals here spoken of are for the purpose of isolating the several concentrations of liquid and of preventing their intermingling at the boundaries between them. The manner in which these seals are effected is shown in Figures 10, 11, and 12. The seals are broken when operation is resumed by virtue of vigorous circulation of the liquid.

The first place where such a seal is of great importance is at the entrance 74 into the washing or extracting settling compartment 39. After shut-down, the liquid in settling compartment 38 and idle mixing compartment A consists of cooking liquor, which is somewhat denser or heavier than the weak liquor contained in compartment 39, on the lower side of opening 74. When the jets or nozzles in compartment A are turned off, a dense bed of solids settles in A, and flows out through 74 forming heaps of solids upon the partition 66b, as shown in Figure 10, until the openings 74 are closed, thereby forming a sludge seal between 39 and A.

A seal is established in a similar manner at outlet 77 from mixing compartment B, isolating the clarified weak liquor compartments 39 and 40 from the compartment 41 below containing somewhat less concentrated weak liquor, as is also shown in Figure 10. In this case, a heap of solids accumulates upon the center of partition 66a, choking up the passage 77. A similar seal is established at the other outlet 77 from compartment C.

The particular seals above described are suitable where the solid sludge is relatively heavy and of considerable bulk or quantity, as in the case of calcium-carbonate sludge in causticizing operations. A modification is preferred where the sludge is less dense and not of such great quantity (this condition obtains in the green-liquor wash settler) which modification is adaptable by changing the dimensions and proportions to denser sludges also. This is shown in Figures 11 and 12, as adapted for lighter and less bulky sludges. In this case, the mixing troughs are offset somewhat so that the agitator shaft 20 and outlet opening 77 are near one side of the trough instead of at the center, and a baffle plate 91, having a long inclined portion 91a parallel to the mixing trough sides, a short end portion 91b, and a cover portion 91c, is framed into the mixing trough, joining the side wall of tank 15 at one end, and settling compartment partition plate 66a along the upper edge. Baffle 91 confines quiescent solids in an inlet channel to the mixing compartment, a portion of which, heaping against the lower edge of 91 upon the mixing trough bottom, traps the sludge within the trough forming an effective seal.

This type of baffle may be adapted for various conditions merely by varying its depth or form. A modified form suitable for large quantities of carbonate sludge is shown at 92 in Figure 4. The principal difference between the two embodiments shown in the depth to which the baffle extends into the mixing trough. Many other baffling arrangements are contemplated for special applications, and may be used in the practice of my invention.

It is thus apparent that my invention provides for the unification into one apparatus of many varying processing functions, including as an essential final step the wash-settling treatment of solids. The elimination of sludge seals during operation between compartments and the independent forced circulation of fluids provides an apparatus which can be built to any desired height without operating limitations due to head of liquid, but with great flexibility of arrangement of parts and order of treating steps.

While I have described apparatus for the causticizing of green liquor, which is a useful embodiment of my invention, this is but one example of the flexibility in effecting useful and simplified combinations which my invention provides. Various changes and modifications therein are within the contemplation of my invention, depending for example upon the particular chemical or physical process for which it is utilized, the character of the materials to be used, and the nature of the products to be produced.

I claim as my invention:

1. In multiple tray settling apparatus for collecting solids suspended in liquids including a vertical cylindrical tank having substantially horizontal vertically spaced partitions dividing the tank into settling compartments, the combination of an inlet duct extending axially of said tank through aligned openings in all but the lowermost of said partitions, a sludge-collecting passage disposed substantially radially between the wall of said inlet duct and the wall of said tank and extending longitudinally through aligned slots in said partitions, rotating scraper means movable adjacent the upper surface of each partition to remove settled solids and to scrape them into said sludge-collecting passage, said sludge-collecting passage having slots in the lateral walls thereof adjacent said horizontal partitions for passage of the scraper means thereacross and for the ingress of said settled solids, said inlet duct being confined by a lateral wall closed adjacent said sludge-collecting passage and provided with outlets communicating with the interior of each of said settling compartments, means for rotating said scraper means, means for removing solids at the bottom of said sludge-collecting passage, and means for removing liquid effluent from each settling compartment substantially at the circumference and top thereof.

2. In multiple tray settling apparatus for collecting solids suspended in liquids, having a vertical cylindrical tank divided into a plurality of settling compartments by horizontal partitions, radially disposed scrapers adjacent the upper surface of each partition revoluble about the axis of said tank to gather and discharge settled solids, means for rotating said scraper means liquid effluent removal means provided near the top and circumference of each compartment, a solids-removal passage extending longitudinally through said compartments and a feed duct for the suspension to be separated communicating with all compartments in parallel, the improvement comprising a cylindrical feed passage concentric with the axis of said tank and axis of revolution of said scraper arms, stationary cylindrical walls for said passage depending from each partition except the lowermost and terminating slightly above said scrapers, rotating cylindrical walls supported by said scrapers substantially continuous with said stationary walls providing adjacent location of the solids discharge duct and the feed duct without intermingling of the incoming suspension with the outgoing solids, said solids-discharge passage extending radially between said feed duct and the wall of said cylindrical tank, and each of said stationary cylindrical walls of said feed duct having openings into each settling compartment, said openings communicating only with said settling chamber and directing the flow of suspension away from said solids removal passage.

3. In apparatus for contacting finely divided solids with liquids, a vertical cylindrical tank having therein vertically spaced partitions forming a vertical series of settling compartments with substantially horizontal floors, to which finely divided solids may settle from liquid contained in each compartment, the floor of each of said settling compartments having an aperture, a scraper adjacent the floor of each settling compartment movable to scrape material settling therein to said apertures, means for rotating said scraper means mixing compartments intermediate said settling compartments into which the scraped material descends through said apertures, piping for introducing liquid into said mixing compartments, thereby agitating the liquid and finely divided solids therein, each mixing compartment having apertures for the flow of liquid containing suspended solids into the settling compartment below that from which that mixing compartment receives the solids, an outlet for clarified liquid from the upper portion of each settling compartment, means for controlling the flow through each of said outlets, and means for collecting and removing solids from the lowest settling compartment.

4. In apparatus for the successive countercurrent treatment of solids with liquids, a vertical cylindrical tank having therein vertically spaced partitions forming a vertical series of settling compartments, mixing compartments intermediate said settling compartments, piping in each of said mixing compartments for introducing liquid therein in contact with the solids present and for creating a free-flowing suspension of solids in the liquid, the bottom of each mixing compartment having ports opening into an adjacent lower settling compartment for the flow of said suspension into said adjacent lower settling compartment, liquid outlet means in each settling compartment remote from the said suspension ports in the adjacent mixing compartments, a solids-removal scraper movable adjacent the floor of each settling compartment, means for rotating said scraper means said floor of each settling compartment having a solids outlet in the path of said scraper and opening directly into the next mixing compartment of said series, means for removing solids from the bottom of the apparatus, means for supplying a stream of liquid to the piping in the lowermost mixing compartment of said series, means for removing effluent liquid from the uppermost settling compartment of said series, and a plurality of pump means each connected to withdraw liquid from the liquid outlet means of one of the settling compartments and deliver it to the piping of a higher mixing compartment.

5. Apparatus for extracting divided solids by contact with a liquid comprising a vertical cylindrical tank having therein vertically spaced partitions forming a vertically arranged series of compartments forming chambers each consisting of two settling compartments for the separation of solids from the liquid, means for introducing a suspension of solids and liquids into the uppermost of said two compartments, and a mixing compartment disposed between said two settling compartments for contacting the solids and liquid; said settling compartments being each provided with a substantially horizontal floor upon which the solids settle, each floor having a solids outlet, scraper means adjacent to said floors arranged to discharge solids through said outlets, means for rotating said scraper means and liquid-removal means disposed a substantial distance above each floor; said mixing compartment being disposed below the solids-outlet opening of said uppermost settling compartment so as to receive the solids discharged therefrom, and means for introducing liquid in contact with the solids and creating a suspension of solid and liquid; the wall of said mixing compartment having a port providing passage for said suspension into the lowermost of said two settling compartments, means for delivering liquid from one of said liquid-removal means to said means for introducing liquid in said mixing compartment, independently of pressure differential between said compartments, and means at the bottom of the apparatus for removing solids discharged through the outlet opening in the floor of said lowermost compartment.

6. In apparatus for successive countercurrent contacting of solids with fluids providing a vertical series of mixing and settling compartments, means for introducing solids into a first mixing compartment, nozzles in said first mixing compartment for discharging fluid thereinto in contact with said solids and stirring the solids, said mixing compartment having an opening for the flow of said suspension into an adjacent first settling compartment, a first fluid draw-off conduit in said first settling compartment remote from said opening for the removal of separated fluid, a solids-removal scraper movable adjacent the floor of said first settling compartment, means for rotating said scraper means a solids outlet in said floor and in the path of said scraper communicating with the next mixing compartment of said series, means for introducing fluids into said next mixing compartment, a suspension outlet from said next mixing compartment for flow of a suspension of solids in fluid into an adjacent second settling compartment, means for removing settled solids from said second settling compartment, means for egress of fluid effluent from said second settling compartment and a pump connected to deliver said effluent to the nozzles in said first mixing compartment.

7. Apparatus of the multiple tray settling type adapted for countercurrent treatment of divided solids suspended in liquids comprising a vertical cylindrical tank separated into settling compartments by substantially horizontal partitions, liquid-removal means extending circumferentially of each compartment near the top thereof, each compartment having suspension inlet ports near the bottom thereof substantially concentric with the axis of said tank, each partition having a solids-outlet opening extending radially inwards from the wall of said tank, passages connecting each solids-outlet opening to the suspension inlet port next below, rotating scraper means adapted to remove solids settling on said partitions tangentially and to discharge them through said solids-outlet openings into said passages, means for rotating said scraper means conduits from outside said tank opening into said passages for delivering liquid thereinto, means for delivering liquid withdrawn from some of said liquid-removal means into said passages through said conduits, means for delivering solids to the uppermost of said compartments, means for removing solids from the bottom of said tank and means for supplying fresh liquid to the conduit entering the lowermost of said passages.

8. Apparatus as defined by claim 7 characterized by each compartment having two of said solids-outlet openings diametrically opposite each other and two suspension-inlet ports at diametrically opposed locations on each side of the axis of said tank, the centers of said solids-outlet ports lying in a vertical plane at right angles to the center line through said suspension-inlet ports.

9. Apparatus for the separation of divided solids suspended in liquids and the recovery of a constituent from the separated solids, comprising a vertical tank divided into a plurality of compartments by means of substantially horizontal partitions, said partitions having solids-outlet openings, means for sweeping settled solids from the upper surface of said partitions into said openings, means spaced a substantial distance above said partitions for withdrawing of liquid effluent therefrom, mixing chambers disposed below at least two of said solids-outlet openings to receive solids swept into said openings, liquid-injecting means in said mixing chambers whereby a suspension of solids and liquids can be effected, each mixing chamber having a port for the flow of said suspension into a lower of said compartments, means at the bottom of said apparatus for removal of the separated solids, there being at least two adjacent compartments above the uppermost mixing chamber, a substantially vertical passage from the solids-outlet openings of said two adjacent compartments leading to said uppermost mixing compartment, means for introducing the suspension to be treated concurrently by parallel flow into said two adjacent compartments, run-off means for the effluent product of said two adjacent compartments, means for delivering a washing liquid to the lowermost mixing chamber, pump means for delivering liquid withdrawn from the compartment receiving and separating suspension produced in said lowermost mixing chamber and delivering it to the uppermost mixing chamber, and means for removing wash liquor from the apparatus from the liquid withdrawing means of the compartment receiving and separating suspension produced in said uppermost mixing compartment.

10. In apparatus for treating finely divided solids with liquids, a vertical cylindrical tank having therein vertically spaced partitions forming settling compartments and mixing compartments within the settling compartments, said compartments being arranged in a vertical series, the improvement in mixing compartments comprising a settling compartment above the mixing compartment having a floor with an open inlet therein to pass solids into the mixing compartment, means for introducing liquid into the mixing compartment to create a suspension of solids in said liquid, the mixing compartment having vertical walls extending from the floor of the super-adjacent settling compartment to a point adjacent to the floor of the settling compartment in which it is located, a bottom plate connecting the ends of the vertical walls said bottom plate having at least one outlet to discharge the suspension into the settling compartment in which the mixing compartment is located and into the sub-adjacent mixing compartment.

11. In apparatus for treating finely divided solids with liquids, a vertical cylindrical tank having therein vertically spaced partitions forming alternate mixing compartments and settling compartments in a vertical series in the order of settling compartment, mixing compartment, and settling compartment, an improved mixing compartment having an open inlet to receive solids from a super-adjacent settling compartment, separate means for introducing liquid into the mixing compartment and creating a suspension of solids in said liquid, said improved mixing compartment also having an outlet to discharge said suspension into the sub-adjacent settling compartment, and baffle means disposed to confine said solids only when said liquid discharging means is inoperative so as to create a quiescent heap of solids closing passage for fluids between said sub-adjacent and super-adjacent settling compartments.

12. In apparatus for treating finely divided solids with liquids, a vertical cylindrical tank having therein vertically spaced partitions forming mixing compartments and settling compartments in a vertical series in the order of settling compartment, mixing compartment, and settling compartment, an improved mixing compartment having an open inlet to receive solids from a super-adjacent settling compartment, separate means for introducing liquid into the mixing compartment and creating a suspension of solids in said liquid, said improved mixing compartment also having an outlet to discharge said suspension into a sub-adjacent settling compartment, and baffle means at the discharge side of said outlet effective to confine a heap of solids and close said outlet when said liquid injecting means is inoperative.

13. In apparatus for treating finely divided solids with liquids, a vertical cylindrical tank having therein vertically spaced partitions forming mixing compartments and settling compartments in a vertical series in the order of settling compartment, mixing compartment, and settling compartment, an improved mixing compartment having an open inlet to receive solids from a super-adjacent settling compartment, separate means for introducing liquid into the mixing compartment and creating a suspension of solids in said liquid, said improved mixing compartment also having an outlet to discharge said suspension into a sub-adjacent settling compartment, and baffle means between said inlet and said outlet disposed to confine said solids when said introducing means is inoperative and create a solids seal obstructing fluid passage between said outlet and said inlet.

WILLIAM J. DONOHUE.

REFERENCES CITED

The following references are of record in the file of this patent:

UNITED STATES PATENTS

| Number | Name | Date |
|---|---|---|
| 599,957 | Curtis | Mar. 1, 1898 |
| 632,517 | Curtis | Sept. 5, 1899 |
| 1,518,484 | Cooley | Dec. 9, 1924 |
| 1,534,145 | Stedman | Apr. 21, 1925 |
| 1,817,649 | Rumsey | Aug. 4, 1931 |
| 1,828,794 | Walker | Oct. 27, 1931 |
| 1,923,143 | Gouner | Aug. 22, 1933 |
| 1,938,894 | Darby | Dec. 12, 1933 |
| 1,968,031 | Donohue | July 31, 1934 |
| 2,002,300 | Stoddard | May 21, 1935 |
| 2,003,357 | Gilchrist | June 4, 1935 |
| 2,110,462 | Coberly | Mar. 8, 1938 |
| 2,169,442 | Wuensch | Aug. 15, 1939 |
| 2,218,442 | Bottaro | Oct. 15, 1939 |
| 2,233,619 | Linch | Mar. 4, 1941 |
| 2,239,004 | Harms | Apr. 22, 1941 |
| 2,253,878 | Weber | Aug. 26, 1941 |
| 2,314,977 | Green | Mar. 30, 1943 |